US010911571B2

(12) United States Patent
Goel et al.

(10) Patent No.: US 10,911,571 B2
(45) Date of Patent: Feb. 2, 2021

(54) SYSTEM AND METHOD FOR PRIORITIZING THE DISPOSITION OF REMOTE ASSETS FOR ONLINE PRODUCT LISTINGS

(71) Applicant: Walmart Apollo, LLC, Bentonville, AR (US)

(72) Inventors: Divya Goel, Sunnyvale, CA (US); Charandeep Singh Sehgal, Newark, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/290,081

(22) Filed: Mar. 1, 2019

(65) Prior Publication Data
US 2020/0280617 A1 Sep. 3, 2020

(51) Int. Cl.
*H04L 29/08* (2006.01)
*G06Q 30/06* (2012.01)

(52) U.S. Cl.
CPC ....... *H04L 67/327* (2013.01); *G06Q 30/0643* (2013.01); *H04L 67/1012* (2013.01); *H04L 67/1031* (2013.01)

(58) Field of Classification Search
CPC .............. H04L 67/327; H04L 67/1012; H04L 67/1031; G06Q 30/0643
USPC ........................................................ 709/232
See application file for complete search history.

(56) References Cited

U.S. PATENT DOCUMENTS

| 7,614,552 | B2 | 11/2009 | Roseman et al. | |
|---|---|---|---|---|
| 2003/0005452 | A1* | 1/2003 | Rodriguez | H04N 7/17336 725/86 |
| 2004/0143516 | A1 | 7/2004 | Hastie et al. | |
| 2004/0172476 | A1 | 9/2004 | Chapweske | |
| 2006/0161635 | A1* | 7/2006 | Lamkin | G06F 16/4387 709/217 |
| 2007/0209005 | A1* | 9/2007 | Shaver | G06F 16/958 715/733 |
| 2009/0138380 | A1 | 5/2009 | Roseman et al. | |
| 2011/0202956 | A1* | 8/2011 | Connelly | H04N 21/4755 725/38 |
| 2011/0238455 | A1 | 9/2011 | Duong et al. | |

(Continued)

*Primary Examiner* — Umar Cheema
*Assistant Examiner* — Tony Williams
(74) *Attorney, Agent, or Firm* — Bryan Cave Leighton Paisner LLP

(57) ABSTRACT

A system can comprise one or more processors; and one or more non-transitory computer-readable media storing computing instructions configured to run on the one or more processors and perform: receiving a product listing information from a user via a user interface on a computing device, the product listing information comprising a product identifier and a product image source location uniquely pointing to at least one product image stored remotely; determining a product listing status of the product listing information based on the product identifier; determining a download priority of the at least one product image based on the product listing status and a user priority of the user; conducting a disposition of the product listing information based on the download priority; and providing in real time a disposition notice, based on the disposition of the product listing information, to be rendered on the user interface for the user. Other embodiments are disclosed.

20 Claims, 5 Drawing Sheets

(56) References Cited

U.S. PATENT DOCUMENTS

| | | |
|---|---|---|
| 2012/0216182 A1 | 8/2012 | Ronning et al. |
| 2013/0290106 A1* | 10/2013 | Bradley ................ G06Q 90/20 |
| | | 705/14.64 |
| 2014/0188978 A1 | 7/2014 | Ng et al. |
| 2016/0171439 A1 | 6/2016 | Ladden et al. |
| 2016/0182383 A1* | 6/2016 | Pedersen ............... H04L 47/781 |
| | | 709/226 |
| 2016/0371290 A1* | 12/2016 | Danovitz ................ G06F 16/43 |
| 2018/0039936 A1 | 2/2018 | Klechner et al. |
| 2019/0019244 A1 | 1/2019 | Bangash |

* cited by examiner

400

410 Receive, From User via User Interface on Computing Device, Product Listing Information Comprising Product Identifier & Product Image Source Location

420 Determine Product Listing Status Based on Product Identifier

430 Determine Download Priority Based on Product Listing Status & User Priority

440 Conduct Disposition of Product Listing Information Based on Download Priority

450 Provide in Real Time Disposition Notice, Based on Disposition of Product Listing Information, to User Interface on Computing Device

FIG. 4

SYSTEM AND METHOD FOR PRIORITIZING THE DISPOSITION OF REMOTE ASSETS FOR ONLINE PRODUCT LISTINGS

TECHNICAL FIELD

This disclosure relates generally to the downloading, uploading and processing of an asset for an online product listing from a remote location.

BACKGROUND

Unlike shopping in a brick-and-mortar store, consumers cannot inspect, handle, and/or try on the products when shopping online. Consumers shopping online generally rely heavily on the product description, the product reviews, the product image(s), and/or video(s) demonstrating the use of the product in an online product listing to make a purchase decision. Product listings in an online shop without any product images are thus less favored than the product listings with product images for the same products. As such, almost all online shopping sites, either hosted by online marketplaces and/or retailers, have product images or other assets, such as videos, demonstrating the products for their product listings. The one or more assets for a product listing, such as product images or videos, can be prepared by the online marketplaces or retailers internally, or more commonly, by third parties, including sellers, suppliers, distributors, and/or the media providers hired by the online marketplaces, retailers, sellers, suppliers, or distributors. When the assets for an online product listing are provided by third parties, the system for the online marketplaces or retailers can download these assets from a remote location to ensure that the assets for the product listing will not be lost or tampered with later. When many third parties try to create or update one or more product listings at the same time, such as before the major shopping seasons for the year, the system can slow down significantly, and the third party users have to wait for each request to create or update the product listings to be processed by the system. Very often such slowdowns are caused by the download and/or upload of the assets for the product listings because the sizes of many assets can range from hundreds of megabytes to gigabytes. Therefore, systems and methods for prioritizing the downloading, uploading, and processing of remote assets for online product listings are desired.

BRIEF DESCRIPTION OF THE DRAWINGS

To facilitate further description of the embodiments, the following drawings are provided in which:

FIG. 4 illustrates a flow chart for a method for updating a product listing based on a product listing information provided by a user via a user interface on a computing device, according to another embodiment.

Figure 1:
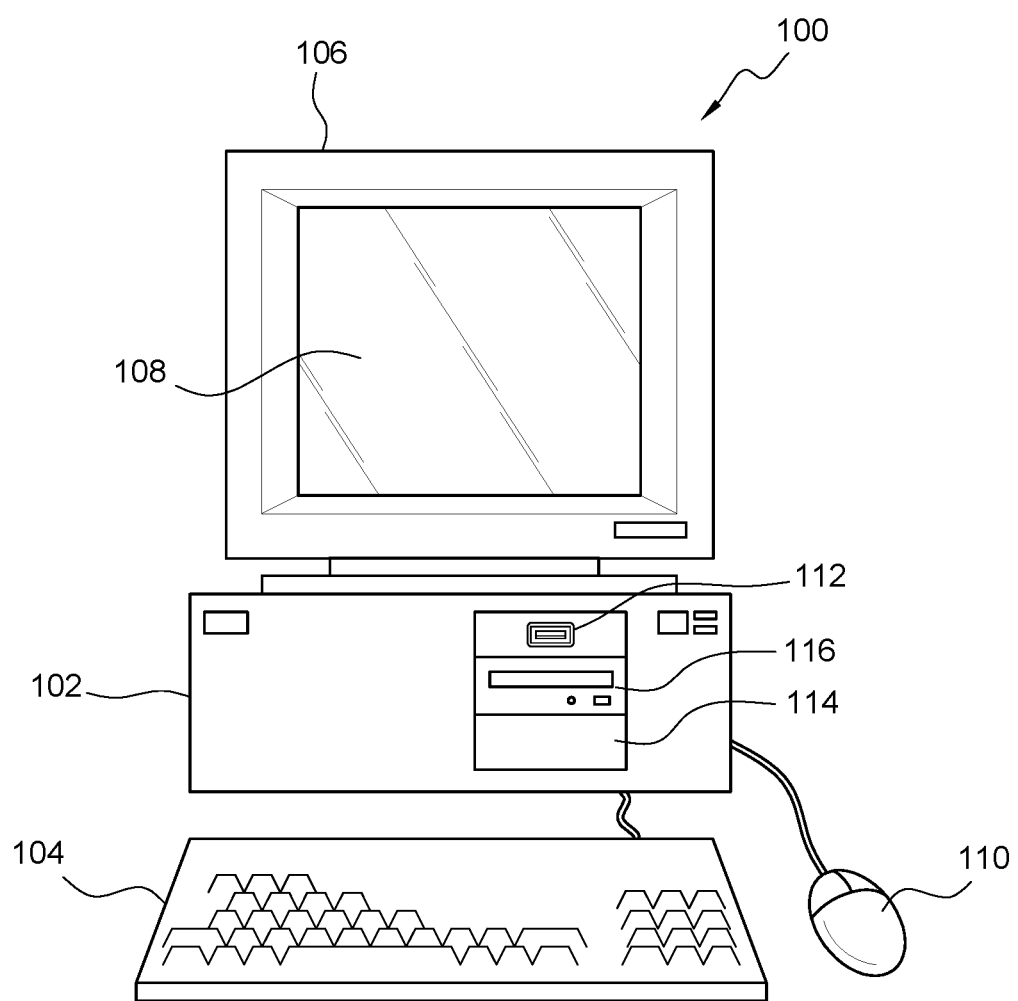
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, or fifteen minutes.

DESCRIPTION OF EXAMPLES OF EMBODIMENTS

Figure 2:
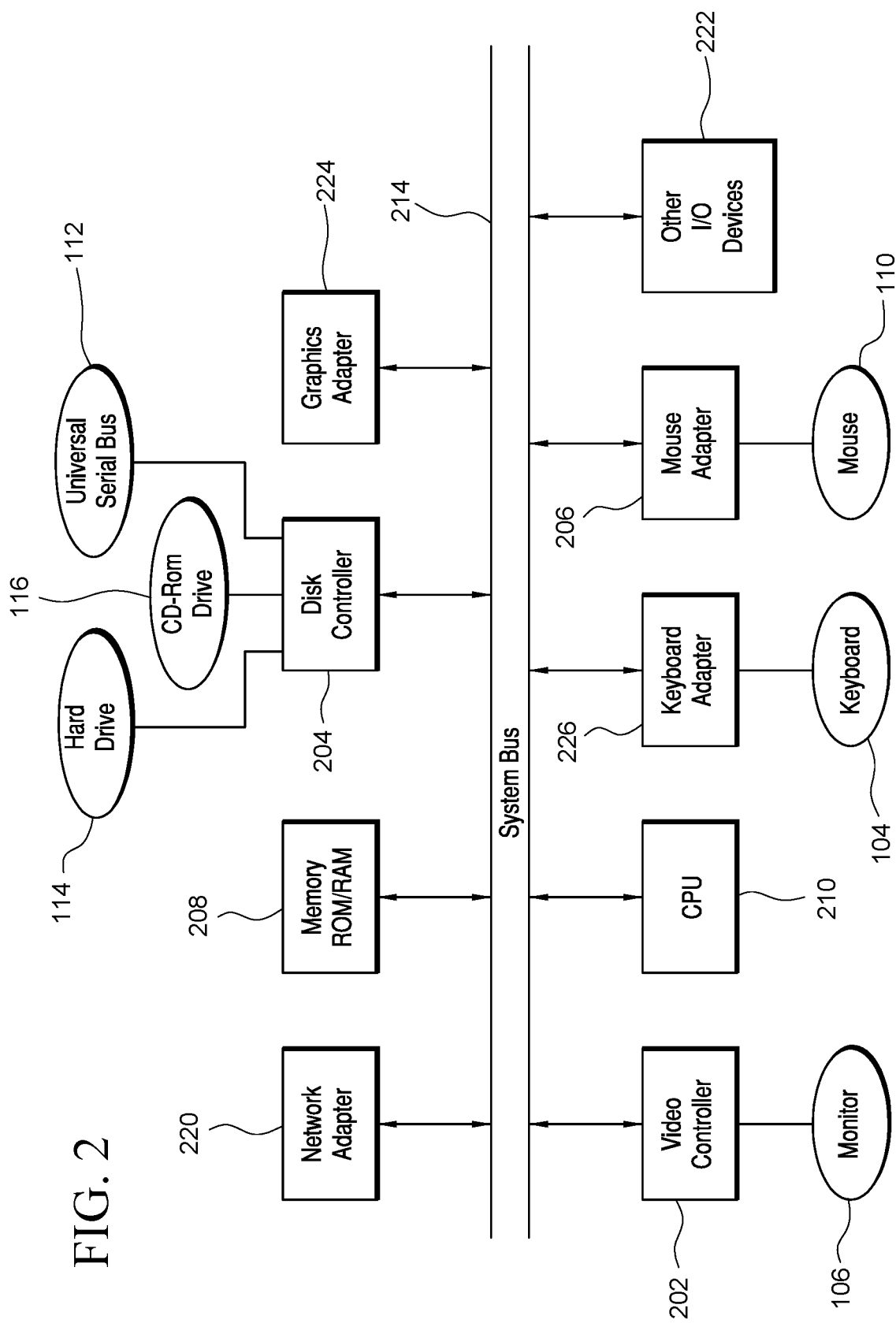
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refers to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
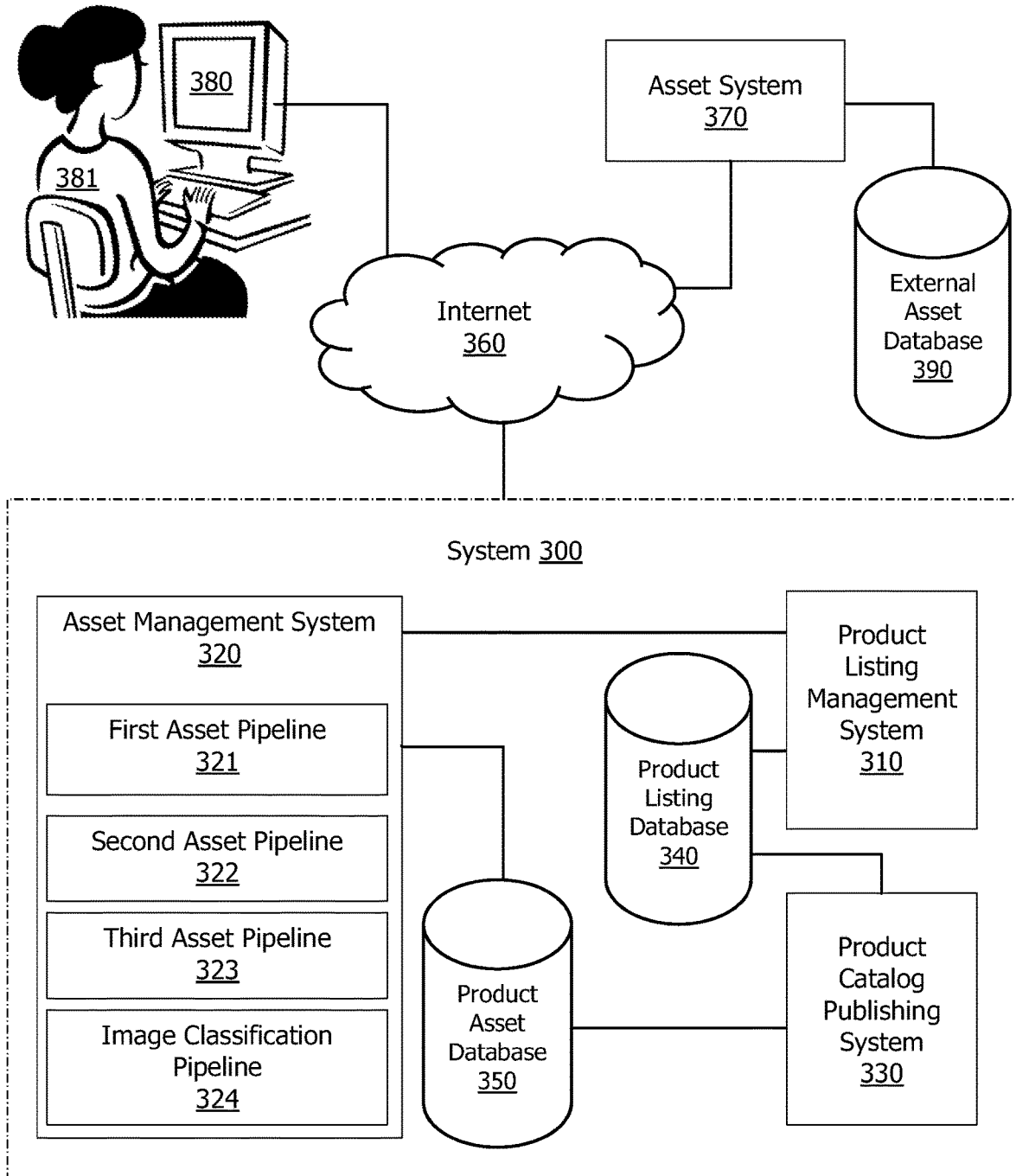
FIG. 3 illustrates a system for maintaining online product listings comprising product images, according to an embodiment.

Turning ahead in the drawings, FIG. 3 illustrates a block diagram for a system 300, according to an embodiment. In many embodiments, system 300 can be configured for one or more users to maintain product listings, including adding or updating the assets for the product listings such as product images or videos, of an online marketplace or a general retailer, such as an online retailer, a department store, or a grocery store, etc. In some embodiments, system 300 can be used by one or more users authorized to create, edit, download, and/or upload the product listings and the assets for the product listings, and the users can include product suppliers, media providers, such as photographers for products, sellers, distributors, system administrators, and so forth. In many embodiments, the assets for the product listings can originally exist in external systems, and system 300 can be configured to prioritize the disposition, such as downloading, uploading, pre-filtering, and/or processing, of the assets in order to avoid overburdening and/or slowing down system 300 due to the limitations in the processing resources and/or network bandwidth of system 300. System 300 is merely exemplary, and embodiments of system 300 are not limited to the embodiments presented herein. System 300 can be employed in many different embodiments or examples not specifically depicted or described herein.

In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can be in data communication with one or more computing devices, such as computing device 380, used by one or more users, such as user 381, through a computing network, such as Internet 360, and be configured to receive a product listing information from the one or more users, such as user 381, to create a new product listing or update an existing product listing. In many embodiments, system 300 can be in further data communication with one or more asset systems, such as asset system 370, through a computing network, such as Internet 360, and be further configured to download from the asset systems, such as asset system 370, one or more assets that are stored in one or more databases, such as external asset database 390, and accessible through the asset systems, such as asset system 370, such that the one or more assets can be uploaded into system 300. Internet 360 can be a public or private network, such as an intranet.

In many embodiments, system 300 can comprise a product listing management system, such as product listing management system 310, an asset management system, such as asset management system 320, a product catalog publishing system, such as product catalog publishing system 330, and one or more databases, such as product listing database 340 and product asset database 350. In many embodiments, an internal network that is not open to the public can be used for communications among product listing management system 310, asset management system 320, and/or product catalog publishing system 330.

In many embodiments as illustrated in FIG. 3, product listing management system 310 can be configured to receive a product listing information from user 381, via a user interface on computing device 380, and create or update a product record in product listing database 340 accordingly. In some embodiments, product listing management system 310 can be in data communication with computing devices 380 through a front end system, such as a website hosted by a web server that hosts one or more other websites. In other embodiments, product listing management system 310 can comprise a web server configured to host one or more websites that are in data communication with computing device 380 and provide user interfaces, such as webpages, or data for user interfaces, such as apps, to be rendered on computing device 380 for submitting the product listing information from user 381.

In many embodiments, the product listing information provided by user 381 can comprise a product identifier and an asset location, such as a product image source location, that uniquely points to at least one product image stored remotely. For example, in an embodiment, the asset location can be a URL (uniform resource locator) to an image file or a URL to a folder containing one or more asset files. In these or other embodiments, the product listing information can further comprise one or more of: one or more product prices, an inventory status, one or more shipment options, one or more product sizes, one or more product colors, one or more product materials, manufacturer information, one or more attributes of an asset for the product, and so on. In many embodiments, when the product listing information includes a product image source location product, product listing management system 310 can forward the product listing information to asset management system 320 to process the product listing information or at least a portion of the product listing information that is pertinent to a new or updated asset, e.g., a new or updated product image. While product images are generally used as examples of assets in embodiments to be discussed below, it is to be understood that these embodiments may be applicable to any forms of assets, such as images, videos, or audios, etc. In addition, the term "product" here is used loosely to refer any goods or services offered online in these embodiments by one or more sellers or providers of such goods or services.

In many embodiments, asset management system 320 can be configured to download a product image that is uniquely pointed to by a product image source location product in the product listing information, and to upload the product image into product asset database 350. In some embodiments, product listing management system 310 can wait for asset management system 320 to report the result of the disposition of the product listing information. In other embodiments, after product listing management system 310 forwards a product listing information to asset management system 320, product listing management system 310 can be configured to immediately proceed with other tasks, such as finishing the creating or updating process of the product listing and notifying user 381 that the update is completed pending the product image being downloaded, without waiting for asset management system 320 to finish downloading the product image from a remote source and uploading the product image into system 300. In such embodiments or other embodiments, asset management system 320 can be configured to report the result of the disposition of the product listing information directly to user 381 by an email, a text message, or a system notice, etc.

In many embodiments where the updates of the product listings and/or assets for the products can be frequent, before or during the holiday season, for example, or where system 300 cannot always allocate sufficient network bandwidth for downloading every product image from the remote source in real time and/or for uploading every product image into system 300, asset management system 320 can be configured to prioritize product images to be downloaded from a remote source and uploaded into system 300 based on a status of the product listing associated with the product listing information and a user priority of user 381. In such embodiments or other embodiments, product listing management system 310 can be configured to wait for asset management system 320 to return and report a disposition of the product image without unacceptable delays. Examples of the disposition by asset management system 320 can include: not downloading the product image because it is a duplicate of an existing product image for the same product listing; a successful download from a remote source and/or a successful upload into system 300 of the product image in real time, or near real time; a failed attempt to download from a remote source and/or a failed attempt to upload into system 300 the product image in real time because the product image source location is not accessible or because the remote asset server, such as asset management system 370, fails to timely respond; the product image being passed to a queue or a pipeline for downloading at a later time, such as midnight or when asset management system 370 determines that the system load is below a certain threshold or that the network is not too busy; and so forth.

As shown in FIG. 3, in many embodiments, asset management system 320 can comprise first asset pipeline 321, second asset pipeline 322, third asset pipeline 323, and image classification pipeline 324. In other embodiments, asset management system 320 can comprise one asset pipeline, two asset pipelines, or three or more asset pipelines. In many embodiments, asset management system 320 can assign the download of a product image to one of first asset pipeline 321, second asset pipeline 322, or third asset pipeline 323 based on the download priority of a product image, determined based on the status of the product listing associated with the product listing information and/or the user priority of user 381, the details of which are discussed in greater detail below. In other embodiments, asset management system 320 can be configured to arrange the download of the product images assigned to first asset pipeline 321, second asset pipeline 322, and/or third asset pipeline 323 in any suitable manners as long as the downloads of the product images are prioritized and asset management system 320 is not overburdened to cause unacceptable delay.

For instance, in some embodiments, asset management system 320 can be configured to: (a) download one or more product images in first asset pipeline 321 as soon as they are assigned to first asset pipeline 321, provided that they are processed in a first-come-first-serve manner; (b) download one or more product images in second asset pipeline 322 when first pipeline 321 is empty; and (c) download one or more product images in third asset pipeline 323 when both first asset pipeline 321 and second asset pipeline 322 are empty. In other embodiments, asset management system 320 can be configured to: (a) download one or more product images in first asset pipeline 321 as soon as they enter first asset pipeline 321; (b) download one or more product images in second asset pipeline 322 at a first later time, such as 11 pm every day; and (c) download one or more product images in third asset pipeline 323 at a second later time, such as 3 am the following day. In yet other embodiments, asset management system 320 can be configured to dynamically adjust the first and second later time based on the system load and/or the network traffic.

In some embodiments, first asset pipeline 321, second asset pipeline 322, and/or third asset pipeline 323 in asset management system 320 can each be configured to merely store information about the product images to be downloaded, uploaded, and processed by the one or more processors of asset management system 320. In other embodiments, first asset pipeline 321, second asset pipeline 322, and/or third asset pipeline 323 in asset management system 320 can each comprise suitable software, hardware, module (s), and/or subsystem(s) configured to download the product images from asset system 370 and upload the product images into product asset database 350 independently, such as in a parallel processing manner.

In many embodiments, before a product image downloaded from the remote database can be uploaded or saved to product asset database 350, in order to ensure the quality of product images in product asset database 350, asset management system 320 can be further configured to download the product image to a temporary storage and forward the downloaded product image to image classification pipeline 324 to filter undesired product images, including product images with one or more image quality issues or one or more items of offensive content. Examples of a product image with an image quality issue can include an image that is entirely blurry, an image that is clear at the edges but has a blurry view of the product, an image where the view of product is too small, an image where a portion of the product is blocked or obscured, an image with a complicated or distracting background, and so forth. Examples of offensive content in the product image can include nudity, pornography, words or symbols that are associated with racism, violence, hate, and so on.

In many embodiments, product catalog publishing system 330 can be configured to publish, or provide to be rendered on user interfaces on computing device 380, one or more product catalogs with product listings from product listing database 340 and assets that are associated with the product listings and retrieved from product asset database 350. In some embodiments, product catalog publishing system 330 can further comprise a search engine configured to receive a search query from user 381 and compile a search result including one or more product listings and assets to be rendered on user interfaces on computing device 380. In many embodiments, asset system 370 can be configured to provide assets stored in external asset database 390 for download to system 300. Examples of asset system 370 can include a remote file server, such as a network-attached storage (NAS), a file-transfer-protocol (FTP) server, and a cloud storage, etc. or a streaming media system, such as a HTTP live streaming (HLS) server, a real time streaming protocol (RTSP) media server, a web real-time communication (WebRTC) media server, etc. In some embodiments, asset system 370 can be hosted by a product supplier, a media provider, system 300, or a third party that provides server hosting services. In other embodiments, system 300 can skip asset system 370 and access external asset database 390 directly.

In many embodiments, system 300 can further comprise one or more of: Internet 360, asset system 370, computing device 380, external asset database 390, or a web server configured to host one or more websites that are in data communication with computing device 380 and provide user interfaces, such as webpages, to be rendered on computing device 380 for user 381 to submit the product listing information or view one or more product listings in product listing database 340, assets in product asset database 350, products in product catalog publishing system 350, etc. In some embodiments, product listing management system 310 can comprise one or more of: asset management system 320, product catalog publishing system 330, product listing database 340, product asset database 350, Internet 360, asset system 370, computing device 380, external asset database 390, or a web server as illustrated above. Product listing management system 310, asset management system 320, product catalog publishing system 330, and asset system 370 can each be a computer system, such as computer system 100 (FIG. 1), as described above, and can each be a single computer, a single server, or a cluster or collection of computers or servers, or a cloud of computers or servers. In other embodiments, a single computer system can host system 300.

In certain embodiments, computing device 380 can be implemented with desktop computers, laptop computers, a mobile device, and/or other endpoint devices used by one or more users, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, system 300, product listing management system 310, asset management system 320, product catalog publishing system 330, and asset system 370 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 300, retail system 310, order management system 3110, driver dispatcher 3120, feedback system 3130, and/or website 3140 in a wired manner and/or a wireless manner, and the coupling can be direct and/or indirect, as well as locally and/or remotely.

As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 300, product listing management system 310, asset management system 320, product catalog publishing system 330, and/or asset system 370. In a similar manner, the processors and/or the non-transitory computer-readable media can be local and/or remote to each other.

Meanwhile, in many embodiments, system 300, product listing management system 310, asset management system 320, product catalog publishing system 330, and asset system 370 each also can be configured to communicate with and/or include one or more databases, such as product listing database 340, product asset database 350, external asset database 390, and/or other suitable databases. The one or more databases can include a product listing database that contains information about one or more products that are offered, or to be offered, for sale by one or more sellers or retailers. The one or more databases can further include a product asset database that contains one or more assets related to one or more products, that are offered, or to be offered, for sale by one or more sellers or retailers, the one or more assets including product images, videos, and/or audios, for example. The one or more databases also can include an external asset database that contains one or more assets, such as images, videos, and/or audios, etc., that can be associated with one or more products and be available for download. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between system 300, product listing management system 310, asset management system 320, product catalog publishing system 330, asset system 370, and/or computing device 380 can be implemented using any suitable manner of wired and/or wireless communication. Accordingly, system 300, product listing management system 310, asset management system 320, product catalog publishing system 330, asset system 370, and/or computing device 380 can each include any software and/or hardware components configured to implement the wired and/or wireless communication.

Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Turning ahead in the drawings, FIG. 4 illustrates a flow chart for a method 400, according to an embodiment. In many embodiments, method 400 can be implemented via execution of computing instructions configured to run at one or more processors and stored at one or more non-transitory computer-readable media, and method 400 can be configured to update a product listing based on a product listing information provided by a user and received from a user interface on a computing device, including downloading at least one product image from a product image source location and uploading to an asset database. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system, such as computer system 100 (FIG. 1) or system 300 (FIG. 3). The processor(s) can be similar or identical to the processor(s) described above with respect to computer system 100 (FIG. 1).

In many embodiments, method 400 can comprise receiving a product listing information from a user, such as user 381 (FIG. 3), via a user interface on a computing device, such as computer system 100 (FIG. 1) or computing device 380 (FIG. 3), the product listing information comprising a product identifier and a product image source location uniquely pointing to at least one product image stored remotely (block 410). In some embodiment, method 400 can be configured to generate a unique product identifier when the product listing information submitted by the user does not contain any product identifier (i.e., the product listing information is for a new product listing). In many embodiments, method 400 can further comprise determining a product listing status of the product listing information based on the product identifier (block 420). In many embodiments, method 400 can then determine a download priority of the at least one product image based on the product listing status and a user priority of the user (block 430).

Examples of the product listing status can include "new" or "existent." In some embodiments, the product listing information itself comprises the product listing status, and method 400 can determine the product listing status by parsing the product listing information. In other embodiments, method 400 can determine the product listing status by trying to retrieve a product record with the product identifier from a product listing database, such as product listing database 340 (FIG. 3). In such embodiments, when no record of product listing with the product identifier can be found from the product listing database, the product listing status can be "new," which indicates that the user is requesting to create a new record of a product listing in the product listing database based on the product listing information and to download a new product image from the product image source location. In these or other embodiments, when the product record associated with the product identifier can be found from the product listing database, the product listing status can be "existent," which indicates that the user is requesting to update the product record in the product listing database based on the product listing information and/or to download a new or updated product image from the product image source location.

In addition, in many embodiments, method 400 can be configured to determine the user priority of the user, such as user 381 (FIG. 3), based on at least one of: a predetermined preferred status of the user, a role of the user, or a prior listing history of the user. In some embodiments, certain users can be predetermined to have higher or lower user priority over other users in term of providing product listing updates and/or product images. For example, when an embodiment is adopted for an online marketplace where the host of the online marketplace also can be a seller of some products in the marketplace, the host can be predetermined to be the most preferred seller, thus having the highest user priority, among all sellers of the same products. In a similar embodiment, a major or a senior seller of a product or some products, such as a seller having the greatest sales volumes or a seller having a good business relationship with the host of the online marketplace or a seller having a highest ranking based on customer reviews, can be predetermined to be a preferred provider of product listing information and/or product images. In some embodiments, the role of a user can affect the user's priority for updating the product listing information and/or the product image. For instance, in many embodiments, wholesale users can generally have a higher priority over retail users. In some embodiments where a user can be a media provider, such as a professional photographer or a media editor, hired and authorized to provide product images for one or more product listings, the media provider also can have a higher user priority over suppliers or sellers because of the expertise of the media provider.

In some embodiments, the prior listing history of a user can affect the user priority of the user to create or update one or more product listings and/or upload product images. In such embodiments, method 400 can be configured to automatically evaluate, or provide a user interface for a system administrator to manually evaluate, the overall quality of product listing information provided by the user over a period of time and automatically determine the user priority based on the determined historical quality. For example, a seller or a supplier that generally uploads product images with better image quality than product images provided by other sellers or suppliers can be determined to have a higher user priority compared to other users.

Furthermore, in some embodiments, a user can have a universal user priority over all products that are associated with this user, such as the host of an online marketplace always having the highest user priority. In these or other embodiments, a user can have different user priorities associated with different products, and each product listing can have an associated list of users that are authorized to create and/or update the product listing. In such embodiments, the user priority of each of the users associated with the product listing can be a ranking of such user among these users, determined based on the predetermined preferred status of the user, a role of the user, and/or a prior listing history of the user, etc.

In many embodiments, method 400 also can comprise conducting a disposition of the product listing information including a product image source location, based on the download priority (block 440). In many embodiments, the disposition can include prioritizing and scheduling the download of at least one product image, that is uniquely pointed to by the product image source location and stored remotely, such as at external asset database 390 (FIG. 3), based on the download priority. For example, in some embodiments, when the download priority is high, the disposition can comprise immediately downloading, or arranging for immediate download by another process, module, or subsystem, the at least one product image, and immediately uploading the at least one product image to an asset database, such as product asset database 350 (FIG. 3), based on the product image source location. Examples of a product image with a high download priority can include a product image for a new product listing, a product image requested to be downloaded/uploaded by a user with a high user priority compared to all other users that had previously caused the downloads/uploads of existing product images, etc.

Furthermore, in some embodiments, when the download priority is high and when the product listing status is "new," the disposition can comprise creating a new product record in a product listing database, such as product listing database 340 (FIG. 3.), based on the product listing information. In some embodiments, when the download priority is high and when the product listing status is "existent," the disposition can comprise updating the product record associated with the product listing, including updating the product image information of the product record based on information of the newly uploaded product image. For instance, in an embodiment, updating the product image information of the product record can include replacing a product image URL of, or inserting a new product image URL to, the product image information of the product record to the URL of the new product image stored at the asset databases, such as product asset database 350 (FIG. 3), and accessible through an asset management system, such as asset management system 320 (FIG. 3).

In some embodiments, when there is at least one preexisting product image for a product listing and the user has so far the highest user priority among the users uploading product images for this product listing, method 400 can adopt only the at least one product image provided by this user in the product listing but not any preexisting product images. In other embodiments, method 400 can instead use the at least one product image provided by this user as the first product image for the product listing while also displaying the at least preexisting product image with the product listing. In yet other embodiments, method 400 can determine whether the at least one product image provided by this user and the at least preexisting product image have the same attributes, such as the same product view, the same product color, and the same product size, and then determine whether the at least one product image provided by this user and the at least preexisting product image can coexist when displaying the product listing.

In some embodiments, when the download priority is not high, the disposition can further comprise scheduling the at least one product image to be downloaded, by asset management system 320 (FIG. 3) or another process, module, or subsystem, for example, and uploaded to the asset database, such as product asset database 350 (FIG. 3), at a later time, based on the product image source location. In an embodiment, the download priority is not high when the download priority is low, medium, or duplicate, each of which are explained further below. In an embodiment, a later time can be a fixed time, such as 9 pm every day or 12 am every Saturday, or be dynamically determined by method 400, such as when the network traffic is light compared to a predetermined threshold.

In some embodiments, when the product image source location is the same as that of one of the existing product images for the existing product listing, method 400 can be configured to determine that the download priority is "duplicate" and the disposition can be not downloading the duplicate product image and not updating the product image information of the product record for the product listing. In these embodiments, a data record for an existing product image previously uploaded into an asset database, such as product asset database 350, can comprise information about where the existing product image was downloaded from so that method 400 can determine whether the product image for a product listing has been downloaded before and avoid unnecessary waste of system resource to download the same product image again.

In addition, in many embodiments, method 400 can further comprise determining that the at least one product image is not savable. In many embodiments, method 400 can be configured to forward the product image source location to an image classification module or system, such as image classification pipeline 324 (FIG. 3), and receive the determination of whether the at least one product image is not savable from the image classification module or system. In other embodiments, method 400 can be configured to download the product image from a remote asset system, such as asset system 370 (FIG. 3), and upload or save the product image to a temporary storage, such as a volatile memory, for analyzing whether the at least one product image is not savable.

In some embodiments, method 400 can assume that the at least one product image is savable until it is time to download the at least one product image from the remote source and upload the at least one product image to the asset database, such as product asset database 350 (FIG. 3). In other embodiments, method 400 can make such determination immediately after receiving the product listing information and skip the disposition, including the download or scheduling for download, of the product image when the product image is determined to be not savable. For example, in an embodiment, a product image can be determined to be not savable when the product image source location is not a valid location, such as a URL directed to an unregistered domain name, or an incomplete URL, etc. A product image also can be determined to be not savable in this or other embodiments when the product image contains one or more image quality issues, such as blurry product view, missed focus, complicated/distracting background, a partially blocked or obscured view of the product, a relatively small product view in the product image, and so forth. In some embodiments, a product image with offensive content(s) can be determined to be not savable as well, and examples of offensive contents can include one or more symbols and/or text representing, or related to, nudity, racism, pornography, violence, or hate, etc.

In many embodiments, the disposition also can comprise further prioritizing product images to be downloaded later based on the user priority of the user(s), such as user 381 (FIG. 3), submitting the product listing information and the properties of the product images relative to existing product images. In such embodiments, some of the product images scheduled to be downloaded at the later time can be scheduled to be downloaded at a first later time, and the rest of the product images scheduled can be scheduled to be downloaded at a second later time, a third later time, or a fourth later time, etc., that are farther away from the current time than the first later time. For example, a new product image that is supplemental to preexisting product images can be downloaded after the download of another new product image that also does not have high download priority but is not supplemental, such as a product image that has different product view, color, and size than those of the preexisting product images.

In many embodiments, after the disposition of the product listing information has been done, method 400 can be configured to provide in real time a disposition notice, based on the disposition, to be rendered on the user interface for the user (block 450). An exemplary disposition notice can comprise a message about the status of the disposition, such as "the product listing has been successfully updated," "the product image cannot be found; please confirm the product image source location is correct," or "the product listing has been successfully updated and the system will notify you upon the completion of the upload of the product image," etc. In another example, the disposition notice can further comprise an animated image showing the progress of the download from the remote database and the upload into the system when the disposition comprises an immediate download of the product image or the progress of the determination of whether the product image is savable when method 400 is configured to make such determination in real time.

Figure 5:
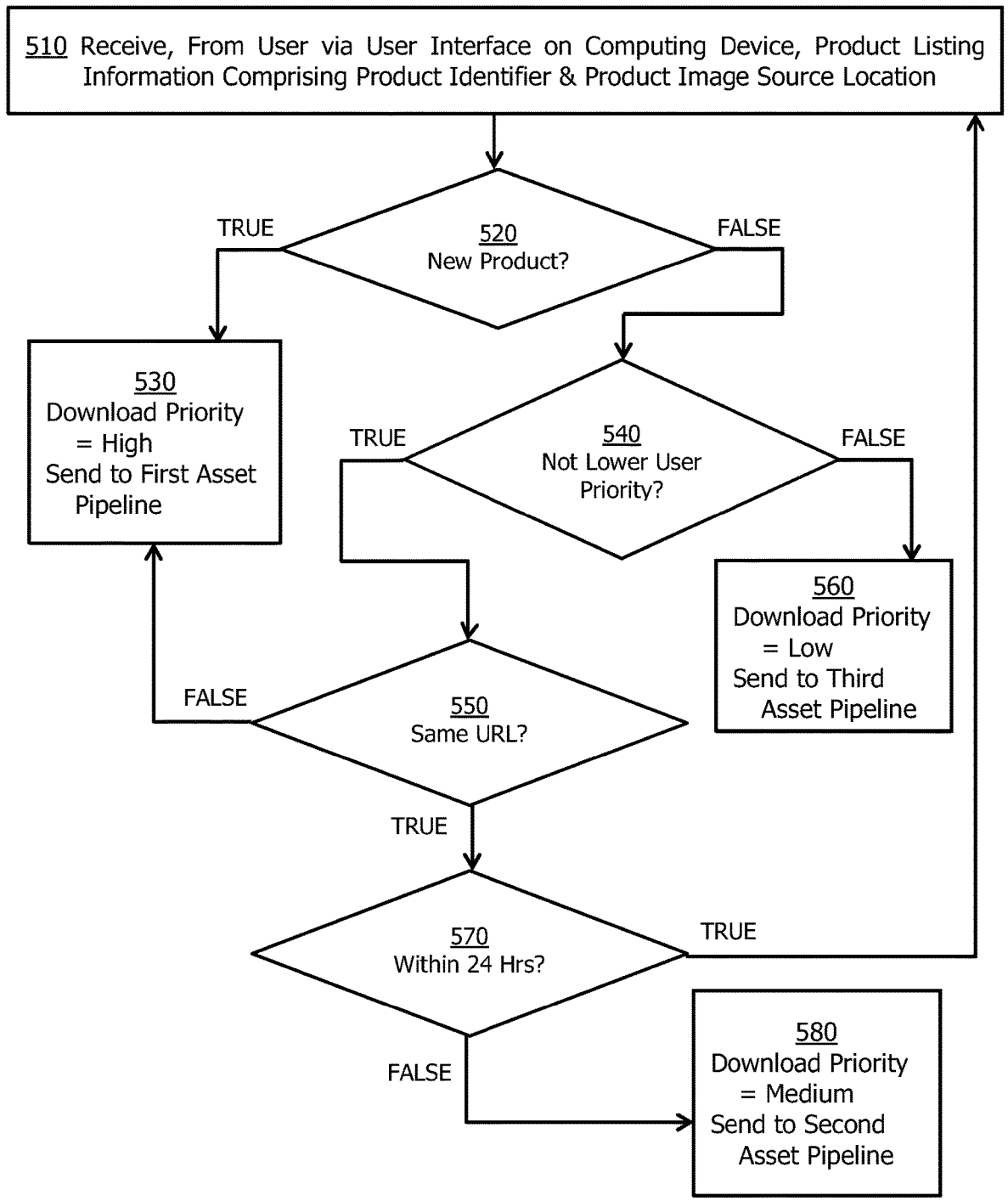
FIG. 5 illustrates a flow chart for a method for prioritizing the downloading, uploading, and processing of a product image, according to another embodiment.

Turning ahead in the drawings, FIG. 5 illustrates a flow chart for method 500 for prioritizing a product image for download, according to another embodiment. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped.

In many embodiments, system 300 (FIG. 3) can be suitable to perform method 500 and/or one or more of the activities of method 500. In some embodiments, all or some activities of method 500 can be integrated with, or supplement, method 400 (FIG. 4) for creating or updating a product listing with at least one associated product image. In these or other embodiments, one or more of the activities of method 500 can be implemented as one or more computing instructions configured to run at one or more processors and configured to be stored at one or more non-transitory computer readable media. Such non-transitory computer readable media can be part of a computer system, such as computer system 100 (FIG. 1) or system 300 (FIG. 3). The processor(s) can be similar or identical to the processor(s) described above with respect to computer system 100 (FIG. 1).

In many embodiments, method 500 can comprise receiving, from a user, such as user 381 (FIG. 3), via a user interface on computing device, such as computing device 380 (FIG. 3), a product listing information comprising a product identifier and a product image source location (block 510). In many embodiments, method 500 can determine whether the product listing information is for a new product listing or an existing product listing (block 520), by checking whether a product record associated with the product identifier exists in a product listing database, such as product listing database 340 (FIG. 3) or by checking a command in the product listing information. When the product listing information is related to a new product listing, method 500 in these embodiments can determine that the download priority is "high" and send the product listing information to be processed by a first asset pipeline (block 530), such as first asset pipeline 321 (FIG. 3).

In some embodiments, the first asset pipeline can be configured to download a product image, that is uniquely pointed to by the product image source location and assigned to the first asset pipeline, as soon as possible, such as immediately after receiving the product listing information or immediately after other product images, that are assigned to the first asset pipeline before the first asset pipeline receives this product listing information, are downloaded. In other embodiments, the first asset pipeline can comprise a first computer configured to download the product image, as soon as possible, such as immediately after receiving the product listing information or immediately after other product images, that are assigned to the first asset pipeline before the first asset pipeline receives this product listing information, are downloaded.

In many embodiments, when the product identifier is associated with an existing asset record comprising at least one preexisting product image, method 500 can determine whether the user priority of the user submitting the product listing information, such as user 381 (FIG. 3), is higher than, or equal to, the user priority of at least one other user that had the at least one preexisting product image downloaded from a remote source (block 540). In many embodiments, when the user priority of the user is higher than, or equal to, the user priority of at least one other user, method 500 can further determine whether the product image can be a duplicate of the at least one preexisting product image. In some embodiments, method 500 can determine whether the product image is likely a duplicate of the at least one preexisting product image by comparing the product image source location with the preexisting image source location of the at least one preexisting product image (block 550). In these or other embodiments, when the product image is determined that it is not a duplicate, method 500 can further determine that the download priority is "high" and send the product listing information to be processed by a first asset pipeline (block 530), such as first asset pipeline 321 (FIG. 3).

In such embodiments, when the product image can be a duplicate, method 500 can further determine whether the product image and the at least one preexisting product image are revised or edited at roughly the same time by comparing their respective timestamps (block 570). In these embodiments, when the difference between the timestamp of the product image and the timestamp of the at least one preexisting product image is determined to be within a time difference threshold, such as 2 hours, 10 hours, or 24 hours, etc., in block 570, method 500 can skip the downloading process for this product image for one or more reasons such as that the update is too frequent, that the change between the two product images with the same URL may not be significant, and/or the potential system slowdown caused by the download. In these embodiments, when the difference between the timestamps is within the time difference threshold, method 500 can determine that the download priority is "medium" and send the product listing information to be processed by a second asset pipeline (block 580), such as second asset pipeline 322 (FIG. 3).

In some embodiments, method 500 can be configure to use only the one or more product images provided by the user that has the highest user priority among all the users for the product listing, except when the newly downloaded product image is a real duplicate of, i.e., being exactly the same as, a previously downloaded product image, also provided by the user. That is, in these embodiments, only product images assigned to the first and second asset pipelines can be used with the product listings. In some embodiments, method 500 can determine that the product image in the second asset pipeline is a real duplicate of the previously downloaded product image and be configured to not use the product image in the second asset pipeline for the product listing by comparing the image hash of the product image in the second asset pipeline image and that of the previously downloaded product image.

Depending on the implementation, the image hash of a product image can be determined by method 500 after the product image in the second asset pipeline is downloaded, or predetermined by another system, such as an image editing program or the user interface used by the user to edit the product listing information, etc. In some embodiments, before a product image is determined to be a duplicate or not, method 500 can download the product image from a remote source to a temporary storage, rather than directly saving to the asset database, and move or copy the product image to the asset database after the comparison. In other embodiments, method 500 can directly compare the product image, that is downloaded from the remote source, and the at least one preexisting product image, such as using a bit-by-bit comparison.

In many embodiments, when the user priority of the user is lower than the user priority of the at least one other user, method 500 can determine that the download priority is "low," and send the product listing information to the third asset pipeline (block 560). In some embodiments, compared to the product image in the first asset pipeline, the product image assigned to the second asset pipeline can be scheduled to be downloaded at a first later time, and the product image assigned to the third asset pipeline can be scheduled to be downloaded at a second later time. The first later time can be farther away in time than the current time but closer to the current time than the second later time.

In other embodiments, while a product image in the first asset pipeline is to be downloaded by a first computer, the product image in the second asset pipeline can be downloaded by a second computer, and the product image in the third asset pipeline can be downloaded by a third computer. In such embodiments, relative to the first computer, the second computer can have a lower system capacity, and the third computer can have the lowest system capacity. Examples of factors for determining a system capacity can include a number of processors used, the processing capabilities of the processors, the memory sizes, or the network bandwidths of the first, second, and third computers. In these embodiments, the first, third, and third computers can each comprise a separate server, such as computer system 100 (FIG. 1), or a virtual machine, configured to concurrently download the product image at different speeds.

In some embodiments, when method 500 determines that the product image in the third asset pipeline is a duplicate, method 500 also can skip the download of the product image from the remote source and then continue to update the rest of product listing information to the existing product record associated with the product listing. In many embodiments, when the product identifier matches the product identifier of at least one asset record comprising at least one preexisting product image in an asset database, such as product asset database 350 (FIG. 3), method 500 can then decide whether the product image is a duplicate by comparing the product image source location with the preexisting image source location of the at least one preexisting product image in the asset database, such as product asset database 350 (FIG. 3).

In some embodiments, when a system availability indicator determined based on a system load or an available network bandwidth is higher than a threshold, method 500 can further comprise "upgrading" the product image provided by the user with a lower user priority (i.e., the download priority is "low") to the second asset pipeline, so that the product image is either downloaded earlier than usual, such as from 10 pm to 8 pm, or downloaded by a faster computer, such as the second computer.

In many embodiments, when the user priority of the user is lower than the user priority of the at least one other user, method 500 can further determine whether the product image is supplemental to the at least one preexisting product image. In some embodiments where a product listing only uses one or more product image(s) provided by a user with the highest user priority among all the users providing product images for this product listing, when the product image is supplemental to the at least one preexisting product image, and when the at least one preexisting product image is shown with the product listing, even though the user priority of the user is not the highest, method 500 can use the product image for the product listing, until the user with the highest user priority provides a new product image to replace this product image.

In some embodiments, a product image is supplemental to another product image when an attribute of the product image is identical to a corresponding attribute of the at least one preexisting product image, and the attribute and the corresponding attribute can be at least one of: a product color, a product view, or a product size. For example, when a first product image has the image attributes related to the product including "front view," "red," and "size 10," method 500 of an embodiment can determine that this first product image is supplemental to a second product image with the image attributes related to the same product including "front view," "black," and "size 8;" a first photograph of a right side elevational view of a bicycle can be determined to be supplemental to a second photograph of a perspective view of the same bicycle; and a first product image showing a top plane view of a 5" black cell phone can be determined to be not supplemental to a second product image showing a back view of a 6" silver cell phone.

In other embodiments, product images that are different only in their respective product views are determined to be supplemental. For such embodiments, a product image with "red," "size 10," and "front view" is supplemental only to another product image for the same product with "red," "size 10," and a different product view. In yet other embodiments, method 500 can determine that the minimum number of matching image attributes required for the determination of being supplemental or not is based on the types of the products associates with these product images. In some embodiments, method 500 can determine the attribute of the at least one product image based on a product image description of the product listing information and/or an image recognition model configured to identify and retrieve one or more image attributes of the at least one product image.

In many embodiments where the disposition of product images in the second or third pipeline is to schedule the download to a later time, method 500 can have a first set of one or more product images assigned to the first asset pipeline, such as first asset pipeline 321 (FIG. 3), downloaded at a current time, i.e., soon as they are assigned to the first asset pipeline; schedule a second set of one or more product images assigned to the second asset pipeline, such as second asset pipeline 322 (FIG. 3), to be downloaded at a first later time; and schedule a third set of one or more product images assigned to the third asset pipeline, such as third asset pipeline 323 (FIG. 3), to be downloaded at a second later time. The first later time can be farther away in time than the current time but closer to the current time than the second later time.

In such embodiments, method 500 can set the first later time and the second later time each to a predetermined time of a day, such as 9 pm, 11 pm, 1 am, or 3 am, etc. In these or other embodiments, when it is time to download a product image assigned to the second or third asset pipeline, method 500 can further comprise determining whether the system is available for uploading based on a system load or a network traffic. In such embodiments, when the system is available for uploading product images of lower priorities, method 500 can start downloading the product image from the remote source and uploading or saving to the asset database, such as product asset database 350 (FIG. 3), based on the product image source location; and when the system is not available for uploading product images of lower priorities, method 500 can reschedule the download of the at least one product image from the remote source and the upload to the asset database at a further later time. For example, when it is now 8 pm, the first later time for method 500 to download product images assigned to the second asset pipeline, but many users are still working hard to create new product listings for the coming holiday season, as each new product listing is associated with at least one product image, the system can still be busy downloading these new product images from remote sources and/or the available network bandwidth can be insufficient for additional downloads. In this example, method 500 can reschedule the download to 2 hours or 3 hours later or even skip the download today and wait until the next first later time, i.e., 8 pm tomorrow, in this example.

In many embodiments where only the product image(s) provided by the user with the highest user priority among the users associated with a product listing are used for the product listing, method 500 can further periodically update the user priority of each user associated with the product listing based on the changes in the user rankings, business relationships, and/or sales volumes, etc., for example, and the update of the user priority can then affect the product image(s) to be used for the product listing when the user with the highest user priority can change. For example, method 500 can check the user priority of each user associated with each existing product listing, find the user with the highest user priority, and update the product image information of the product record for the product listing accordingly.

In addition, even for embodiments that use only product images provided by the user that has the highest user priority among all the users for the product listing, it can be beneficial for the systems or methods to keep the product images downloaded at the third pipeline in the asset database because the user priority for each user can change over time and also because some users could quit after acquiring the highest user priority.

In an embodiment, a system can comprise one or more processors; and one or more non-transitory computer-readable media storing computing instructions. In this embodiment, the computing instructions can be configured to run on the one or more processors and perform a method for prioritizing and downloading at least one product image provided in a product listing information based on a product listing status and a user priority in order to avoid overburdening the system. In this embodiment, the method can comprise receiving a product listing information from a user via a user interface on a computing device, the product listing information comprising a product identifier and a product image source location uniquely pointing to at least one product image stored remotely. After receiving the product listing information, the method in this embodiment can then determine a product listing status of the product listing information based on the product identifier and a download priority of the at least one product image based on the product listing status and a user priority of the user, as described below.

In this embodiment, the product listing status can be either new or existent, and the download priority can be set as high or not set as high. In this embodiment, when the product identifier is not associated with any product record in a product listing database, the download priority of the at least one product image can be set as high. When the user priority of at least one other user that provided the at least one preexisting product image is lower than a user priority of the user, the download priority of the at least one product image can be set as high in this embodiment. When the user priority of the at least one other user is higher than the user priority of the user, in this embodiment, the download priority of the at least one product image can be not set as high.

With the download priority determined, the method in this embodiment can then conduct a disposition of the product listing information based on the download priority. In this embodiment, the disposition can comprise: (a) when the download priority is high, downloading the at least one product image to an asset database; and (b) when the download priority is not duplicate and when the download priority is not high, scheduling the at least one product image to be downloaded to the asset database at a later time. Alternatively, in this embodiment, the disposition can comprise: (a) when the download priority is high, downloading the at least one product image to the asset database by a first computer; and (b) when the download priority is not high, downloading the at least one product image to the asset database by a second computer, where the first system capacity of the first computer is higher than the second system capacity of the second computer, such as having more and/or faster processors, larger memory size, faster internet speed, etc. In this embodiment, the method can further be configured to dispose the rest of the product listing information, such as a price or an inventory status, etc. After conducting the disposition of the product listing information, in this embodiment, the method can provide in real time a disposition notice, based on the disposition, to be rendered on the user interface for the user.

In many embodiments, the techniques described herein can provide a practical application and several technological improvements. In many embodiments, the system or the method for prioritizing the disposition of assets for online product listings based on a product listing status and a user priority can comprise specific technological advantages because they improve the performance of the system or method by delaying some downloads with lower priority and avoiding overburdening the system, especially before shopping seasons when updates of product listings can be as frequent as sixty millions per day.

In a number of embodiments, the techniques described herein can advantageously provide a consistent user experience by responding to a user request for creating or updating a product listing by a disposition notice immediately after the disposition, either an immediate or scheduled download, is complete. With the system performance improved as stated above, even the time for immediate downloads can be maintained at a reasonable and acceptable range, and the user can thus experience little difference in processing various user requests regardless of differences in download priorities. Indeed, in a test environment where an embodiment received up to sixty million user requests per day, the throughput of the embodiment has been significantly improved, such as from 1 million downloads of product images per hour to 2.5 million downloads per hour, and the time for the embodiment to process a user request has been reduced, such as reducing up to 1.6 hours in the average process time.

In many embodiments, the techniques described herein can be used continuously at a scale that cannot be handled using manual techniques. For example, the number of product listing information provided by the users in the system can exceed many thousands or even millions a day at its peak. In a number of embodiments, the techniques described herein can solve a technical problem that arises only within the realm of computer networks, as downloading remote product images and updating online product listings for online product catalogs do not exist outside the realm of computer networks. Moreover, the techniques described herein can solve a technical problem that cannot be solved outside the context of computer networks. Specifically, the techniques described herein cannot be used outside the context of computer networks, in view of the enormous amount of product listings and other data that must be timely received, transmitted, organized, updated, and managed.

Although systems and methods for prioritizing the disposition of at least one product image for an online product listing based on a product listing status and a user priority have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities in the blocks of FIGS. 4 and 5 may include different procedures, processes, activities, and/or blocks and may be performed by many different components in many different orders. As yet another example, the grocery store and order can be replaced by a general retail store and a general retail order.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions configured to run on the one or more processors and perform:
  receiving a product listing information from a user via a user interface on a computing device, the product listing information comprising a product identifier and a product image source location uniquely pointing to at least one product image stored remotely;
  determining a product listing status of the product listing information based on the product identifier;
  determining a download priority of the at least one product image based on the product listing status and a user priority of the user;
  conducting a disposition of the product listing information based on the download priority of the at least one product image, comprising only one of:
    (a) when the download priority of the at least one product image is high, downloading the at least one product image to an asset database; and
      when the download priority of the at least one product image is not high, scheduling the at least one product image to be downloaded to the asset database at a later time; or
    (b) when the download priority of the at least one product image is high, downloading the at least one product image to the asset database by a first computer; and
      when the download priority of the at least one product image is not high, downloading the at least one product image to the asset database by a second computer,
    wherein:
      a first system capacity of the first computer is higher than a second system capacity of the second computer;
  and
  providing in real time a disposition notice, based on the disposition of the product listing information, to be rendered on the user interface for the user,
  wherein:
    when the product identifier is associated with a product record in a product listing database:
      when (a) a user priority of at least one other user that provided at least one preexisting product image in the asset database is higher than the user priority of the user, wherein the at least one preexisting product image is associated with the product identifier, or (b) when the user priority of the at least one other user is lower than the user priority of the user and when the download priority of the at least one product image is duplicate, the download priority of the at least one product image is not set as high; and
      when the user priority of the at least one other user is lower than the user priority of the user and when the download priority of the at least one product image is not duplicate, the download priority of the at least one product image is set as high; and when the product identifier is not associated with any product record in the product listing database, the download priority of the at least one product image is set as high.

2. The system in claim 1, wherein:

when the user priority of the at least one other user is higher than the user priority of the user, the download priority of the at least one product image is set as low;

when the user priority of the at least one other user is lower than the user priority of the user and when the download priority of the at least one product image is duplicate, the download priority of the at least one product image is set as medium; and conducting the disposition of the product listing information based on the download priority of the at least one product image further comprises only one of:
  (a) when the download priority of the at least one product image is medium, downloading the at least one product image at a first later time;
    when the download priority of the at least one product image is low, downloading the at least one product image at a second later time;
    the later time comprises the first later time and the second later time;
    the first later time is farther away in time than a current time; and
    the first later time is closer to the current time than the second later time; or
  (b) when the download priority of the at least one product image is low, downloading the at least one product image to the asset database by a third computer, wherein:
    the second system capacity of the second computer is higher than a third system capacity of the third computer.

3. The system in claim 2, wherein:

conducting the disposition of the product listing information based on the download priority of the at least one product image further comprises:
  when the download priority of the at least one product image is low:
    determining a system availability indicator based on a system load or an available network bandwidth; and
    when the system availability indicator is higher than a threshold, only one of:
      downloading the at least one product image at the first later time; or
      downloading the at least one product image to the asset database by the second computer.

4. The system in claim 2, wherein:

when the download priority of the at least one product image is high, conducting the disposition further comprises updating the product record based on the product listing information; and when the download priority of the at least one product image is medium:
  determining a first image hash of the at least one product image;
  determining a second image hash of the at least one preexisting product image; and
  when the first image hash is not equal to the second image hash, conducting the disposition further comprises updating the product record based on the product listing information.

5. The system in claim 2, wherein:

when the product image source location is identical to a preexisting image source location of the at least one preexisting product image that is associated with the product identifier and that is retrieved from the asset database, the download priority of the at least one product image is set as duplicate.

6. The system in claim 5, wherein:

the product listing information further comprises a timestamp; and conducting the disposition of the product listing information based on the download priority of the at least one product image further comprises:
  when the download priority of the at least one product image is medium:
    determining a time difference between the timestamp of the product listing information and a timestamp of the at least one preexisting product image; and
    only one of:
      (a) downloading the at least one product image at the second later time only when the time difference is more than 24 hours; or
      (b) downloading the at least one product image to the asset database by the second computer only when the time difference is more than 24 hours.

7. The system in claim 1, wherein:

the user priority of the user is determined based on at least one of: a predetermined preferred status of the user, a role of the user, or a prior listing history of the user.

8. The system in claim 1, wherein:

scheduling the at least one product image to be downloaded to the asset database at the later time further comprises:
  determining at the later time whether the system is available for downloading based on a system load or an available network bandwidth;
  when the system is available for downloading, downloading the at least one product image to the asset database, based on the product image source location; and
  when the system is not available for downloading, scheduling the at least one product image to be downloaded to the asset database at a further later time.

9. The system in claim 1, wherein:

conducting the disposition further comprises:
  when the download priority of the at least one product image is high, the product record is updated based on the product listing information.

10. The system in claim 2, wherein:

conducting the disposition further comprises:
  when (a) the download priority of the at least one product image is high, or (b) the download priority of the at least one product image is medium, updating the product record based on the product listing information.

11. A method being implemented via execution of computing instructions configured to run at one or more processors and stored at one or more non-transitory computer-readable media, the method comprising:
  receiving a product listing information from a user via a user interface on a computing device, the product listing information comprising a product identifier and a product image source location uniquely pointing to at least one product image stored remotely;

determining a product listing status of the product listing information based on the product identifier;
determining a download priority of the at least one product image based on the product listing status and a user priority of the user;
conducting a disposition of the product listing information based on the download priority of the at least one product image comprising only one of:
(a) when the download priority of the at least one product image is high, downloading the at least one product image to an asset database; and
when the download priority of the at least one product image is not high, scheduling the at least one product image to be downloaded to the asset database at a later time; or
(b) when the download priority of the at least one product image is high, downloading the at least one product image to the asset database by a first computer; and
when the download priority of the at least one product image is not high, downloading the at least one product image to the asset database by a second computer,
wherein:
a first system capacity of the first computer is higher than a second system capacity of the second computer; and
providing in real time a disposition notice, based on the disposition of the product listing information, to be rendered on the user interface for the user,
wherein:
when the product identifier is associated with a product record in a product listing database:
when (a) a user priority of at least one other user that provided at least one preexisting product image in the asset database is higher than the user priority of the user, wherein the at least one preexisting product image is associated with the product identifier, or (b) when the user priority of the at least one other user is lower than the user priority of the user and when the download priority of the at least one product image is duplicate, the download priority of the at least one product image is not set as high; and
when the user priority of the at least one other user is lower than the user priority of the user and when the download priority of the at least one product image is not duplicate, the download priority of the at least one product image is set as high; and
when the product identifier is not associated with any product record in the product listing database:
the download priority of the at least one product image is set as high.

12. The method in claim 11, wherein:
when the user priority of the at least one other user is higher than the user priority of the user, the download priority of the at least one product image is set as low;
when the user priority of the at least one other user is lower than the user priority of the user and when the download priority of the at least one product image is duplicate, the download priority of the at least one product image is set as medium; and
conducting the disposition of the product listing information based on the download priority of the at least one product image further comprises only one of:
(a) when the download priority of the at least one product image is medium, downloading the at least one product image at a first later time;
when the download priority of the at least one product image is low, downloading the at least one product image at a second later time;
the later time comprises the first later time and the second later time;
the first later time is farther away in time than a current time; and
the first later time is closer to the current time than the second later time; or
(b) when the download priority of the at least one product image is low, downloading the at least one product image to the asset database by a third computer, wherein:
the second system capacity of the second computer is higher than a third system capacity of the third computer.

13. The method in claim 12, wherein:
conducting the disposition of the product listing information based on the download priority of the at least one product image further comprises:
when the download priority of the at least one product image is low:
determining a system availability indicator based on a system load or an available network bandwidth; and
when the system availability indicator is higher than a threshold, only one of:
downloading the at least one product image at the first later time; or
downloading the at least one product image to the asset database by the second computer.

14. The method in claim 12, wherein:
when the download priority of the at least one product image is high, conducting the disposition further comprises updating the product record based on the product listing information; and
when the download priority of the at least one product image is medium:
determining a first image hash of the at least one product image;
determining a second image hash of the at least one preexisting product image; and
when the first image hash is not equal to the second image hash, conducting the disposition further comprises updating the product record based on the product listing information.

15. The method in claim 12, wherein:
when the product image source location is identical to a preexisting image source location of the at least one preexisting product image that is associated with the product identifier and that is retrieved from the asset database, the download priority of the at least one product image is set as duplicate.

16. The method in claim 15, wherein:
the product listing information further comprises a timestamp; and
conducting the disposition of the product listing information based on the download priority of the at least one product image further comprises:
when the download priority of the at least one product image is medium:
determining a time difference between the timestamp of the product listing information and a timestamp of the at least one preexisting product image; and only one of:
- (a) downloading the at least one product image at the second later time only when the time difference is more than 24 hours; or
- (b) downloading the at least one product image to the asset database by the second computer only when the time difference is more than 24 hours.

17. The method in claim 11, wherein:

the user priority of the user is determined based on at least one of: a predetermined preferred status of the user, a role of the user, or a prior listing history of the user.

18. The method in claim 11, wherein:

scheduling the at least one product image to be downloaded to the asset database at the later time further comprises:

determining at the later time whether a system is available for downloading based on a system load or an available network bandwidth;

when the system is available for downloading, downloading the at least one product image to the asset database, based on the product image source location; and when the system is not available for downloading, scheduling the at least one product image to be downloaded to the asset database at a further later time.

19. The method in claim 11, wherein:

conducting the disposition further comprises:

when the download priority of the at least one product image is high, the product record is updated based on the product listing information.

20. The method in claim 12, wherein:

conducting the disposition further comprises:

when (a) the download priority of the at least one product image is high, or (b) the download priority of the at least one product image is medium, updating the product record based on the product listing information.

* * * * *